(12) United States Patent
Lagrotta et al.

(10) Patent No.: US 12,113,608 B2
(45) Date of Patent: Oct. 8, 2024

(54) TRANSMISSION OF ATMOSPHERIC DUCTED COMMUNICATION SIGNALS

(71) Applicant: General Dynamics Mission Systems, Inc., Fairfax, VA (US)

(72) Inventors: Richard Lagrotta, Fairfax, VA (US); John Kleider, Fairfax, VA (US); George Kannell, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 393 days.

(21) Appl. No.: 17/664,001

(22) Filed: May 18, 2022

(65) Prior Publication Data

US 2023/0403073 A1  Dec. 14, 2023

(51) Int. Cl.
*H04B 7/22* (2006.01)
*H04B 7/26* (2006.01)

(52) U.S. Cl.
CPC ............. *H04B 7/22* (2013.01); *H04B 7/2662* (2013.01)

(58) Field of Classification Search
CPC ................................ H04B 7/22; H04B 7/2662

USPC .......................................................... 342/367
See application file for complete search history.

(56) References Cited

FOREIGN PATENT DOCUMENTS

WO    WO-2015082914 A1 *  6/2015 ......... H04B 10/1129

* cited by examiner

*Primary Examiner* — Harry K Liu
(74) *Attorney, Agent, or Firm* — Lorenz & Kopf, LLP

(57) ABSTRACT

A communications system including a transmit processor for determining transmit and azimuth elevation in response to a refractive layer altitude, a transmitter array including a plurality of transmitters each for transmitting one of a plurality of transmitted signals in response to the transmit elevation wherein each of the plurality of transmitted signals is encoded using a data signal and one of a plurality of unique synchronization sequences, and a receiver for receiving the plurality of transmitted signals, isolating each of the plurality of transmitted signals in response to one of the plurality of unique synchronization sequences corresponding to each of the plurality of transmitted signals to generate a plurality of isolated signals, to combine the plurality of isolated signals to generate a combined signal and to generate the data signal in response to the combined signal.

20 Claims, 6 Drawing Sheets

TRANSMISSION OF ATMOSPHERIC DUCTED COMMUNICATION SIGNALS

TECHNICAL FIELD

The technical field relates generally to electromagnetic transmitter and receivers, and more particularly relates to methods and apparatus for providing over the horizon maritime data communications by employing beam acquisition, adaptive and/or distributed beamforming techniques to address propagation impairments caused by the rapid decrease in refractive index of the lower atmosphere.

BACKGROUND

Long range maritime communications systems have long taken advantage of the ionospheric reflection to transmit low frequency radio waves beyond the horizon. Atmospheric or evaporative ducts may similarly be used over the earth's surface to contain electromagnetic signals in order to increase propagation distance at frequencies of approximately 100 MHz and above. The atmospheric duct results from a refracting layer created from the rapid decrease in humidity with respect to altitude occurring in the atmospheric surface layer above bodies of water. This duct acts as a waveguide, much like a fiber optic strand, to contain electromagnetic energy and limits the spread of the energy within the duct. This increases the range of the transmitted signal by guiding the electromagnetic waves to follow the curvature of the earth to enable over the horizon communications and radar.

To fully take advantage of the benefits of the atmospheric duct, a transmitted signal must be transmitted at particular elevation such that the beams elevation enables propagation within the duct. Too high an angle of incidence allows the signal to propagate through the layer into the upper atmosphere. This elevation may be difficult to predict as the altitude of the refractive layer may change with humidity, atmospheric pressure, and temperature. In addition, weather conditions, sea state, and orientation of the transmission antenna may further affect the success of the signal transmission. As such, it is desirable to address these problems and provide a robust solution for transmission of electromagnetic signals within an atmospheric ducted condition. In addition, other desirable features and characteristics will become apparent from the subsequent summary and detailed description, and the appended claims, taken in conjunction with the accompanying drawings and this background.

SUMMARY

Disclosed herein are communications systems, communication algorithms, sensors, transmitter and receiver arrays and related control logic for provisioning long range communications systems, methods for making and methods for operating such systems, and other systems equipped with such transmitters, receivers, and transceivers in an array configuration. By way of example, and not limitation, there is presented method and apparatus for providing an a plurality of transmitters for transmitting a plurality of transmission signals and a plurality of receivers to generate a plurality of correction weights in response to the transmission signals received from a plurality of transmitters. This system operation may employ distributed coding signals or may use mechanical or electrical steering on the transmit side in a particular pattern. The transmit signal may be acquired when the receiver captures the transmitted signal in such a search pattern. These correction weights may be leveraged to determine optimal transmission conditions for an improved communications range and signal quality.

In accordance with an aspect of the present disclosure, a method for transmitting a data signal including estimating an altitude of an atmospheric refractive layer, encoding a data signal with a first synchronization sequence to generate a first transmission signal and encoding the data signal with a second synchronization sequence to generate a second transmission signal, transmitting, using a first array element, the first transmission signal at a first elevation angle determined in response to the altitude of the atmospheric refractive layer, transmitting, using a second array element, the second transmission signal at a second elevation angle determined in response to the altitude of the atmospheric refractive layer, receiving, at a receiver, the first transmission signal and the second transmission signal, isolating the data signal from the first transmission signal in response to the first synchronization sequence to generate a first isolated data signal and determining a first offset of the first isolated data signal, isolating the data signal from the second transmission signal in response to the second synchronization sequence to generate a second isolated data signal and determining a second offset of the second isolated data signal, and combining the first isolated data signal and the second isolated data signal in response to the first offset and the second offset.

In accordance with another aspect of the present disclosure, a communications system including a transmit processor for determining transmit elevation in response to a refractive layer altitude, a transmitter array including a plurality of transmitters each for transmitting one of a plurality of transmitted signals in response to the transmit elevation wherein each of the plurality of transmitted signals is encoded using a data signal and one of a plurality of unique synchronization sequences, wherein each of the plurality of unique synchronization sequences corresponds to one of the plurality of transmitted signals, and a receiver configured for receiving the plurality of transmitted signals, isolating each of the plurality of transmitted signals in response to one of the plurality of unique synchronization sequences corresponding to each of the plurality of transmitted signals to generate a plurality of isolated signals, to combine the plurality of isolated signals to generate a combined signal and to generate the data signal in response to the combined signal.

In accordance with another aspect of the present disclosure, a method of communications including transmitting, by a transmitter array, a first transmission signal at a first elevation angle wherein the first transmission signal includes a first synchronization sequence, a second transmission signal at a second elevation angle wherein the second transmission signal includes a second synchronization sequence; and a third transmission signal at a third elevation angle wherein the third transmission signal includes a third synchronization sequence, receiving, at a receiver array, the first transmission signal, the second transmission signal, and the third transmission signal, isolating, by a processor, a data signal from the first transmission signal in response to the first synchronization sequence, the data signal from the second transmission signal in response to the second synchronization sequence, and the data signal from the third transmission signal, determining an first offset in response to the data signal from the first transmission signal, a second offset in response to the data signal from the second transmission signal, and a third offset in response to the data signal from the third transmission signal, estimating an optimal transmit elevation angle in response to the first offset, the second offset, and the third offset, and transmitting the optimal transmit elevation angle to the transmitter array.

Other objects, advantages and novel features of the exemplary embodiments will become more apparent from the following detailed description of exemplary embodiments and the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Various non-limiting embodiments of communications systems, communication system algorithms, and software are provided. In general, the disclosure herein describes a communications system employing distributed coding with error correction to provide improved directivity and signal-to-noise ratio (SNR) for signal transmission within an atmospheric duct that affords, but is not limited to, range extension, lower transmit power, higher throughput, and interference mitigation.

Use of atmospheric duct communications systems are receiving increased interest for military and commercial applications due to radio frequency spectral congestion and general increases in radio frequency and microwave carrier frequencies. Some communications systems may employ transmitter arrays including a plurality of spatially distributed transmitters transmitting data to a receiver or plurality of receivers. One of the most challenging aspects of atmospheric ducted communications schemes is transmitting the communications signal at an elevation which provides for the optimal reflection of the signal from surface duct to reduce reflection loss to maintain signal amplitude, reduce propagation distance and minimize interference.

Figure 1:
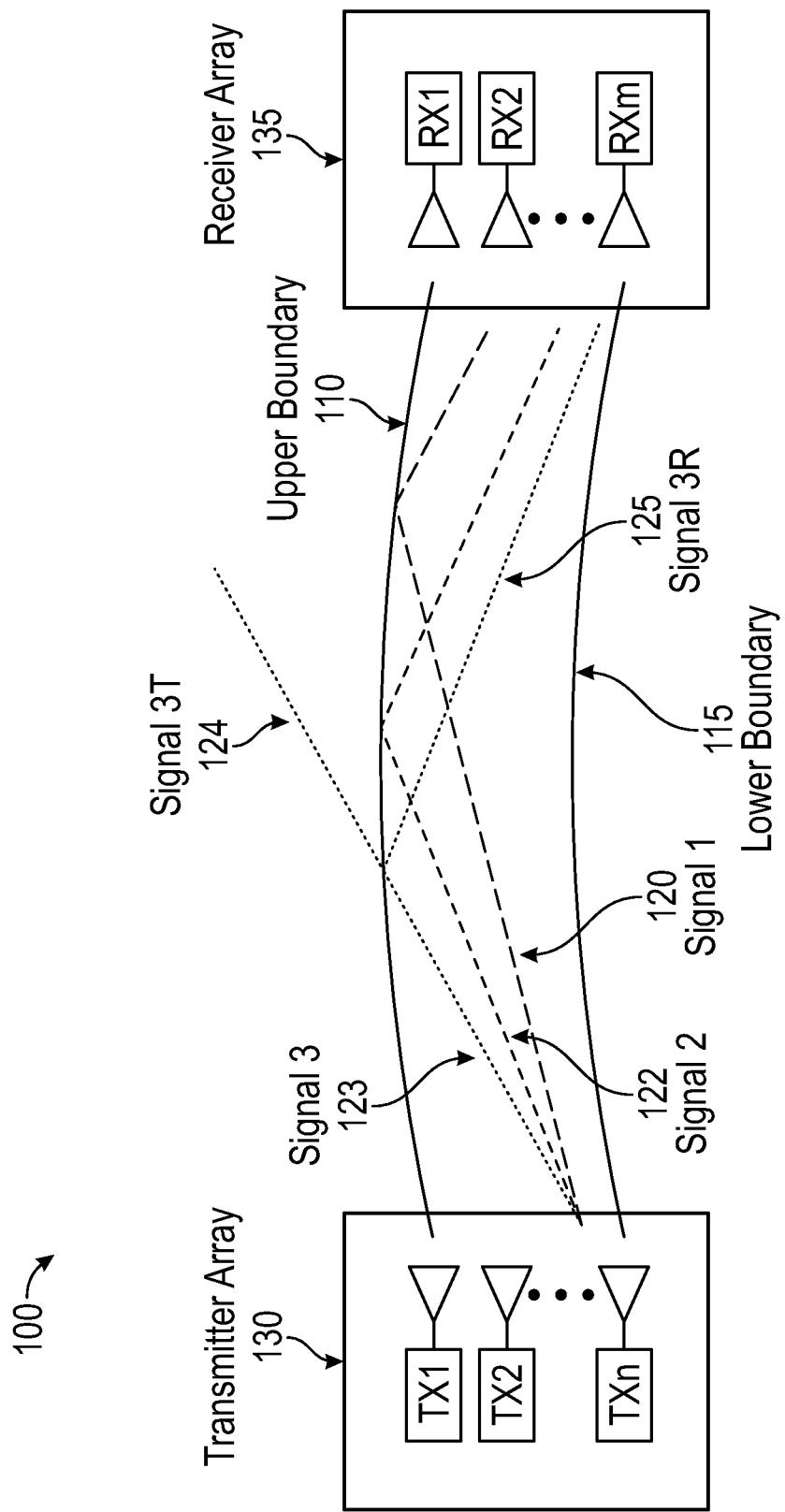
FIG. 1 illustrates an environment for implementing a system for transmission of electromagnetic and/or acoustic signals within an atmospheric ducted condition according to an exemplary embodiment of the present disclosure.

Turning now to FIG. 1, an environment 100 for employing a system for transmission of electromagnetic and/or acoustic signals within an atmospheric ducted condition according to an exemplary embodiment of the present disclosure is shown. The exemplary environment 100 includes a receiver array 135 and a transmitter array 130 transmitting a plurality of electromagnetic signals 120, 122, 123 within an atmospheric duct bounded by a lower boundary 115 and an upper boundary 110.

In this exemplary embodiment, the transmitter array 130 may include 'n' transmitters TX1, TX2 . . . TXn each configured for transmitting an electromagnetic signal 120, 122, 123 within the atmospheric duct. Each of the plurality of electromagnetic signals 120, 122, 123 may be individually coded using a pilot symbol or the like, such that each signal may be isolated at each of the plurality of 'm' receivers RX1, RX2 . . . RXm. The transmitter array 130 may be initially configured for transmitting the signal at an estimated elevation determined in response to at least one or more of ambient temperature, humidity, and atmospheric pressure. In some exemplary embodiments, the individual transmitters TX1, TX2 . . . TXn may transmit their individually coded signal at slight variations in elevation to the estimated elevation. Each of the receivers RX1, RX2 . . . RXm may be configured to receive representations of all of the transmitted signals, isolate each of the transmitted signals in response to the individual coding, and determine at least one of a phase offset, frequency offset and magnitude offset for each of the transmitted signals. The 'n' isolated signals may then be coherently combined at each of the plurality of receivers RX1, RX2 . . . RXm in response to the determined phase, frequency and magnitude offsets. In some exemplary embodiments, the "n" transmitters may be implemented as a hybrid array, where a single- or multiple-baseband chains are used along with a single- or multiple-RF chains and antenna elements. In some exemplary embodiments with mechanical and/or electrical beam steering, all "n" transmitters may be coherently locked with respect to timing, frequency and phase, where the steering can be done via mechanical pointing or electrical amplitude and or phase adjustments.

The slight variation in elevation for each of the transmitted signals 120, 122, 123 increases the probability that at least one of the transmitted signals is transmitted at the optimal elevation. Since the change in elevation is known by the receiver array 135 for each of the transmitters TX1, TX2 . . . TXn, elevation limits or an optimal transmitter elevation can be determined in response to individual transmitted signal quality or magnitude. If a particular transmitted signal 123 has an angle of incidence too close to the normal of the refractive layer, or upper boundary 110, of the atmospheric duct refractive layer, excessive energy in the form of a transmitted signal 124 will be transmitted through the refractive layer thereby reducing the magnitude of the reflected signal 125 received at the plurality of receivers RX1, RX2 . . . RXm. In addition, a slight variation in elevation for each of the transmitted signals 120, 122, 123 allows for slight variations in the orientation of the transmitter, such as those experienced by a moving vehicle or ship, while maintaining a consistent magnitude of the coherently combined signal at the receiver array. For example, as one reflected signal decreases in magnitude, an adjacent reflected signal will increase in magnitude as each transmission angle moves closer to, or farther away from, the optimal transmission angle.

In some exemplary embodiments where a feedback channel from the receiver array 135 to the transmitter array 130 is available, each of the receivers RX1, RX2 ... RXn may be configured receive representations of all of the transmitted signals, isolate each of the transmitted signals in response to the individual coding, determine phase, frequency and magnitude offset for each of the transmitted signals and couple these individual offsets, to a central processor or the like, for combination and transmission back to the transmitter array 130. In some exemplary embodiments, the central processor may generate correction weights in response to the offsets. In addition, the central processor may determine which of the transmitted signals has the best signal quality and/or signal strength and transmit this determined transmitter back to the transmission array 130. The transmission array 130 may adjust the overall elevation of the transmission array 130 and/or elevation of one or more transmitters TX1, TX2 ... TXn in order to optimize the overall transmitted signal. In other exemplary embodiments, the elevation of the determined transmitter may be used to configure a microwave transmitter for transmitting an alternate signal, such as a microwave data signal. In exemplary embodiments with mechanical or electrically steered case and without distributed coding, the receiver may relay back to the transmitter the optimal parameters where it found the largest signal. The transmitter may then be choose to focus on those areas which maximize the received signal power (or SNR).

Figure 2:
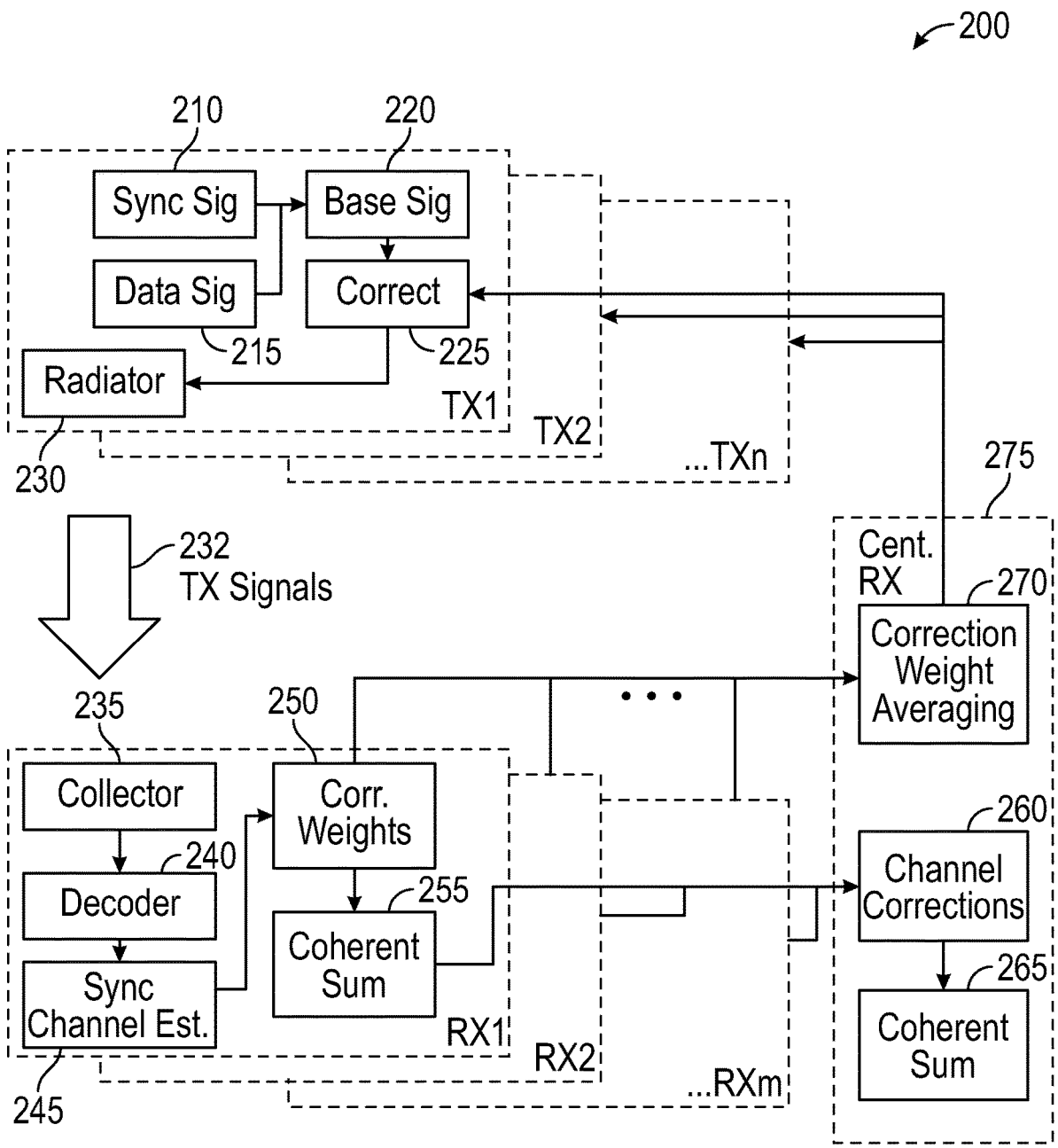
FIG. 2 illustrates a system for transmission of electromagnetic and/or acoustic signals within an atmospheric ducted condition according to an exemplary embodiment.

Turning now to FIG. 2, a system 200 for transmitting and receiving of electromagnetic signals within an atmospheric ducted condition according to an exemplary embodiment is shown. In this exemplary system 200, there are n different elements collaborating in the transmitter array TX1, TX2 ... TXn, while m different elements collaborate in the receiver array RX1, RX2 ... RXm. The exemplary system 200 employs a synchronization-channel estimation sequence 210 applied at each of the n transmitters TX1, TX2 ... TXn. A synchronization-channel estimation sequence 210 is utilized by each of them receivers to enable estimation and removal of any synchronization or channel differences. The synchronization-channel estimation sequence 210 should be one such that timing-, frequency-, and phase-offsets can be determined for each individual transmitter signal. The synchronization-channel estimation sequence 210 may include signal parts that enable magnitude and phase channel differences between each individual transmitter element and each individual receiver antenna element, such that these differences can be estimated and corrected. In some embodiments, channel estimation may be performed by inserting cell-specific reference signals, such as pilot symbols, at assigned positions in both time and frequency. These pilot symbols may be used to provide a reliable estimate of the complex gains of the propagation channel in order to improve the communications system performance in terms of bit error rate and thereby increasing the capacity of the communications system, such as an OFDMA system. In some exemplary embodiments, the synchronization signal 210 may be a sync word, sync character, sync sequence or sync preamble used to synchronize a data transmission by indicating the end of header information and the start of the data signal 215. This synchronization signal 210 may be used to time-align a received signal with local references, such as a data clock and/or demodulator waveforms.

A first of the exemplary transmitters TX1 is configured to generate a baseband signal 220 in response to the synchronization sequence 210 and a data signal 215. The baseband signal 220 may be encoded using CDMA channel access method or any multiple access method. If a feedback channel is available from the receiver array, a correction weight 225 received from the receiver array may be applied to the baseband signal 220 to generate weighted baseband signal. The correction weights 225 may be received from the receiver array to compensate for magnitude, timing and/or phase different resulting from propagation through the atmospheric duct environment. The encoded baseband signal may then be coupled to a radiator for transmission to the receiver array. In some exemplary embodiments, the encoded baseband signal may be transmitted from an element of the transmitter array with an elevation angle determined in response to an estimated refraction layer altitude estimated in response to at least one of a relative humidity, ambient temperature and atmospheric pressure.

In some example embodiments, the baseband signal 220 with magnitude and/or phase error correction weights 225 applied is modulated with appropriate radio frequency carrier signals and the desired carrier frequencies. The encoded baseband signal is then coupled to the radiator 230 and transmitted to the plurality of receivers RX1, RX2, ... RXm as a transmitted signal 232. The correction weights may be used to adjust coarse and fine timing-, sampling, frequency- and/or phase-offsets.

Each of the receivers RX1, RX2, RXm are configured to receive a transmitted signal 232 from each of the transmitters TX1, TX2, TXn by employing one or more collectors 235. Each of the transmitted signals includes the synchronization signal allowing for the transmitted signals from each of the transmitters TX1, TX2, TXn to be identified and isolated. Channel noise and/or time-selective and/or frequency-selective fading may be present in the received signal in addition to the transmitted signals 232. Channel fading could be due to time-, frequency- and/or spatial-variations in the channel over the signal transmission intervals. The collector 235 may include an antenna as well as circuitry to amplify, filter and demodulate the transmitted signals 232 to recover the coded distributed signal. A decoder 240 is employed to decode the coded distributed signal received from the collector 235. The decoder 240 may receive correction weights and/or offset values determined in response to previously received transmit signals.

In a co-located array system, all array elements may be synchronous and phase coherent. In a distributed system, even if each transmitter TX1, TX2 ... TXn is equipped with GPS-discipline oscillators, each transmitter TX1, TX2 ... TXn will still experience synchronization offsets relative to one another due to propagation losses, noise and/or effects from reflections from the upper and lower duct boundaries. Distributed antenna elements within the transmitter and receiver arrays may also experience non-ideal alignment, especially when each node element is mobile, even when precise formation controllers are utilized. To address these issues, the exemplary receiver RX1 is configured to perform the sync channel estimation 245 to determine the phase, frequency, and magnitude offsets for each of the received signals. In some exemplary embodiments, timing and frequency synchronization and channel estimation may be performed on each of the transmit signals by the received signal sync and channel estimation block 245 and the subsequently received transmit signals are magnitude corrected and phase aligned by the Tx magnitude and/or phase correction offsets to enable a coherent sum 255. The Tx magnitude and/or phase correction offsets may be determined for the received signal by the received signal sync and channel estimation block 245 and coupled, with Tx magnitude and/or phase correction offsets from other receivers (RX2 . . . RXn) to a central receiver 275 generate magnitude and/or phase correction weight averages 270 which is transmitted back to the transmitters TX1, TX2, TXn.

In some exemplary embodiments, the magnitude and/or phase error correction weights 250 determined at each of the receivers RX1, RX2, RXm may be relayed back to each transmitter TX1, TX2, TXn if a feedback channel is available. The magnitude and/or phase error correction weights 250 may include any residual synchronization corrections and channel corrections necessary to ensure coherency of the transmit signals to create a coherent beam. The magnitude and/or phase error correction weights 250 may also be used to maximize the global SNR across all receiver elements. For closed-loop operation, the correction weights 250 may be fed back in a single-step, which enables the system to operate in mobile channels. For close-loop operation, the SNR is maximized by coherently aligning the individual transmit signals in the far-field radiated signal. In some exemplary embodiments, error terms are acquired, estimated and averaged at each of the receivers RX1, RX2, . . . RXm. This may involve a bank of synchronizers and maximum likelihood estimators, such as a bank of correlators, the number of which for each receiver is equal to the number of transmitters, N.

In some embodiments, the Tx frequency and timing offsets determined by the received signal sync and channel estimation block 245 and the magnitude and phase corrections 250 may be coupled to a correction weight averaging processor 270 within a central receiver 275 along with the correction weights calculated by the other receivers. The averaged correction weights may then be sent from the central receiver 275 to the transmitters TX1, TX2 . . . TXn and may include sampling offset, frequency offset and/or clock offset corrections for each transmitter TX1, TX2 . . . TXn. The central receiver 270 may then be configured to use M-maximum likelihood estimators to combine each of the receiver estimates to further improve the estimate by a factor of M. Additionally, the central receiver 270 may direct one or more transmitters to turn off distributed coding to the data stream if sufficient coherent gains are realized. For example, a weight vector could be a set of simple complex weights, the size of which is the number of antennas and/or RF chains or simple a vector of all 1's applied to the data and/or the synchronization channel estimation signal.

Finally, the central receiver 270 may include a channel correction processor 260 configured to magnitude correct and phase align each of the received signals from each of the plurality of receivers RX1, RX2 . . . RXn in response to magnitude and/or phase correction weights to compensate for receiver magnitude, phase, frequency and timing offsets. These corrected received signals are then coherently summed 280 to extract the transmitted baseband signal.

Figure 3:
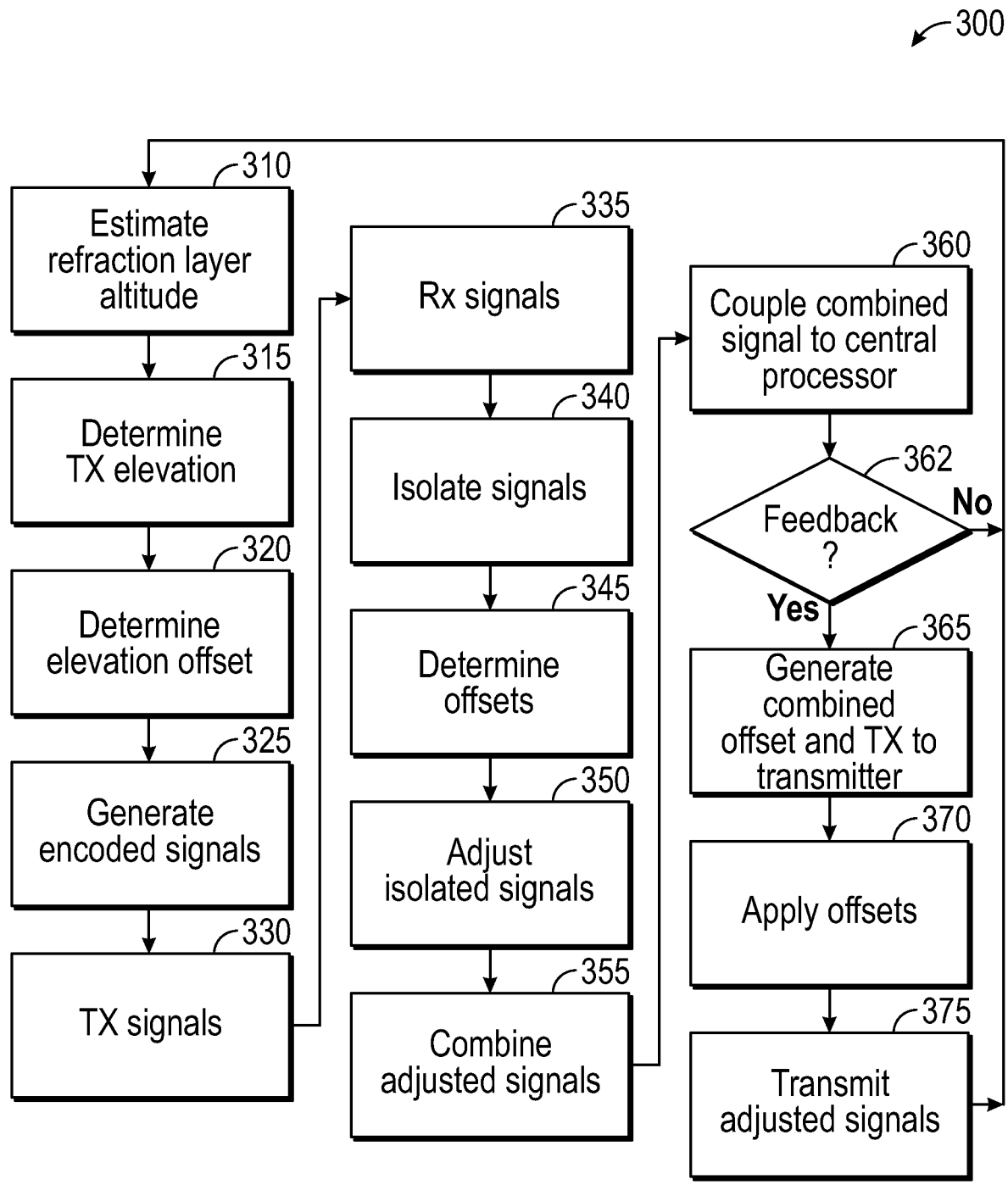
FIG. 3 shows a flow diagram illustrating a non-limiting embodiment of a method for transmission of electromagnetic and/or acoustic signals within an atmospheric ducted condition according to an exemplary embodiment of the present disclosure.

Turning now to FIG. 3, a flow diagram illustrating a non-limiting embodiment of a method 300 for transmitting and receiving of electromagnetic signals within an atmospheric ducted condition according to an exemplary embodiment is shown. The exemplary method 300 may first be operative to estimate 310 an altitude of the refraction layer. The refraction layer is an upper boundary of the atmospheric duct where changes in humidity, density, temperature, and/or atmospheric pressure result in a refractive index gradient at a certain altitude. This refractive index gradient causes some electromagnetic signals incident on the refractive layer to be reflected back in elevation which allows the signals to propagate beyond the line of site. The altitude of the refractive layer may be estimated in response to humidity, temperature, atmospheric pressure and other weather conditions. Alternatively, the refractive layer altitude may be determined in response to a propagation time of a vertically transmitted electromagnetic pulse or other test signal.

The method may next determine 315 a transmission elevation for the array. The transmission elevation may be determined in response to the refraction layer altitude and/or other weather conditions to maximize the propagation distance and reflection of the transmitted signals form the refraction layer. In some exemplary embodiments, the transmission elevation is chosen to be the Brewster angle where the magnitude of the reflected signal is equal to the magnitude of the transmitted signal.

The method may next determine 320 an offset elevation for one or more of the transmission array elements. For a transmission array with multiple transmitters, it may be advantageous to slightly vary the transmission elevation from one or more of the transmitters to compensate for variations and/or changes in the refraction layer altitude, ground or sea conditions, and attitude of the transmitter array and receiver. For example, if a transmitter array is mounted to a vehicle or ship, movements of the transmitter array may introduce slight errors in the actual transmitter elevation. This may be compensated for my transmitting multiple signals at slight variations from the estimated optimal elevation angle increasing the probability that at least one of the transmitted signals is incident on the refraction layer at the Brewster angle and is at a maximum amplitude when received at the receiver antenna.

The method may next generate 325 a plurality of transmission signals encoded with a unique synchronization sequence. In some exemplary embodiments, each of the transmission signals includes the same data to be extracted by the receiver array. However, to allow the individual transmitted signals to the isolated from a combined received signal at an individual receiver, each of the plurality of signals is encoded using a unique synchronization sequence. The synchronization sequence may include a sync word, sync character, sync sequence or sync preamble used to synchronize a data transmission by indicating the end of header information and the start of the data signal. In addition, the transmission signals may be weighted for each of the transmitters in response to feedback from the receiver array. For example, the receiver may transmit frequency, phase and timing offsets for each of a plurality of previously transmitted signals. These offsets may be applied at each individual transmitter of the transmitter array such that the offsets experienced at the receiver array are minimized.

The method may next transmit 330 the plurality of transmission signals at the determined elevations. Each of the transmitters of the transmitter array are configured to transmit a version of the data signal that is encoded with a unique synchronization sequence. The transmitted signals may be transmitted by each of the plurality of receivers at the at the estimated optimal elevation, or each transmitter of the transmitter array may be varied from the estimated optimal elevation to compensate for changes in the altitude of the refraction layer, weather, variation in transmitter position, or the like.

The method may next receive 335 the plurality of transmissions signals at a receiver array. Each of the plurality of receiver elements of the receiver array may receive each of the plurality of transmitted signals as a combined received signal. Each of the received transmitted signals will have slightly varied propagation times, amplitude and phase variations. In addition, the combined received signal may include noise, ghosts of the transmitted signals, spurious signals and other interference. Each receiver element may be configured to filter and amplify the combined received signal to minimize this interference and increase the signal to noise ratio (SNR) of the combined receive signal in before performing further processing. In addition, the system may be configured to demodulate and/or decode the received signals before further processing.

The method may isolate 340 each of the transmitted signals in response to the unique synchronization sequence. Each of the transmitted signals may be identified using the synchronization sequence to isolate the transmitted signal from the combined received signal. After each of the transmitted signals is isolated at each receiver, the method is next configured to determine 345 one or more offsets for each of the isolated signals. The offsets may include magnitude, phase and frequency offsets. These offsets may be induced during signal propagation or may result from relative positioning of the individual transmitters within the transmitter array. For example, if the transmitters are discrete transmitters located at random positions as part of a distributed transmitter array, the propagation distances, transmission elevation, noise sources and the like may vary between the signals received at the receivers.

The method is configured to adjust 350 one or more of the isolated signals in response to the determined offsets. Each receiver is configured to adjust each of the isolated signals using the determined offsets such that the isolated signals may be constructively combined. The offsets allow the isolated signals to be adjusted for phase, magnitude and/or frequency offsets. The method is configured 355 to combine the adjusted isolated signals to generate a combined transmission signal. The combined transmission signal may advantageously compensate for individual, low amplitude signals or individual transmitted signals with lower SNR.

The method is next configured to couple 360 the combined transmission signal to a central processor for combination with other combined transmission signals generated by other receivers. The central processor may receive combined transmission signals from each of the receiver's elements and constructively combine these signals to further increase the SNR and improve signal quality.

In some exemplary embodiments if a feedback channel is available 362 between the receiver array and the transmitter array, the central processor may be configured to receive the offsets from each of the receivers, to generate 365 a set of combined offsets, and to transmit this set of combined offsets to the transmitter array. The transmitter array may then be configured to receive the set of combined offsets and to apply 370 one or more of these offsets to each of the individual transmitters within the transmitter array and to transmit a subsequent plurality of adjusted signals.

In some exemplary embodiments, the transmitter array may be configured to receive the set of combined offsets, to determine an optimal elevation angle for signal transmission in response to the combine offsets, and to transmit 375 a second transmission signal at the optimal elevation angle. The second transmission signal may be transmitted by the transmitter array, or may be transmitted by an alternate transmitter, such as a microwave link transmitter, parabolic antenna, or the like.

Figure 4:
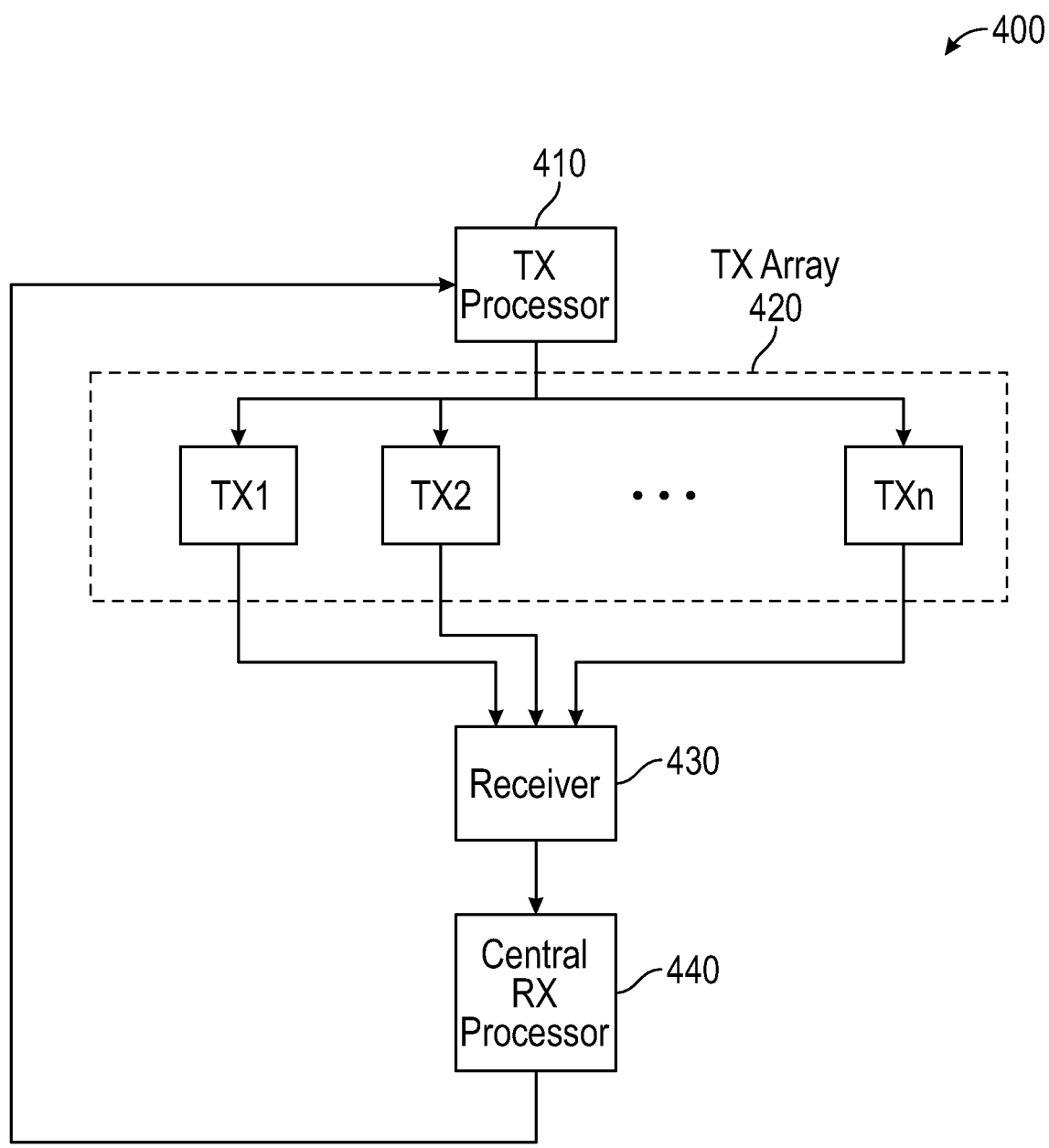
FIG. 4 illustrates an exemplary system for transmission of electromagnetic and/or acoustic signals within an atmospheric ducted condition according to an exemplary embodiment.

Turning now to FIG. 4, another non-limiting embodiment of a system 400 for transmitting and receiving electromagnetic and/or acoustic signals within an atmospheric duct condition. The exemplary system 400 may include a transmit processor 410 for determining transmit elevation in response to a refractive layer altitude; wherein the refractive layer altitude is determined in response to a propagation time of an electromagnetic pulse. wherein the refractive layer altitude is determined in response to at least one of a atmospheric pressure, an ambient temperature, and an ambient humidity level.

A transmitter array 420 including a plurality of transmitters TX1, TX2, . . . TXn each for transmitting one of a plurality of transmitted signals in response to the transmit elevation wherein each of the plurality of transmitted signals is encoded using a data signal and one of a plurality of unique synchronization sequences. Each of the plurality of unique synchronization sequences corresponds to one of the plurality of transmitted signals such that each of the transmitted signals may be isolated by the receiver 430. In some exemplary embodiments each of the plurality of transmitted signals may transmitted with a random transmit elevation within one degree of the transmit elevation. Thus, in this exemplary embodiment, the transmitted signals may have a transmission elevation angle spread of two degrees. This transmission elevation angle spread is not limited to the proposed system and may be determined in response to other engineering considerations.

In some exemplary embodiments, the transmitter array 420 may be configured to transmit a second plurality of signals in response to the optimal transmit elevation. wherein the transmitter array is further configured to couple the optimal transmit elevation to a microwave transmitter for transmitting a microwave signal in response to the optimal transmit elevation. The transmitter array may be further configured to transmit a transmitter position, a transmitter navigation, and a transmitter timing to the receiver. The transmitter position, transmitter navigation and transmitter timing may be used by the receiver to align a receiver array or a receiver antenna for receiving the plurality of transmitted signals.

The receiver 430 may be configured for receiving the plurality of transmitted signals, isolating each of the plurality of transmitted signals in response to one of the plurality of unique synchronization sequences corresponding to each of the plurality of transmitted signals to generate a plurality of isolated signals, to combine the plurality of isolated signals to generate a combined signal and to generate the data signal in response to the combined signal.

In some exemplary embodiments, the receiver 430 may be configured to determine an optimal transmit elevation in response to the combined signal and to couple the optimal transmit elevation to the transmitter array. Likewise, the receiver 430 may be configured to determine a plurality of offsets in response to the plurality of isolated signals, to adjust the plurality of isolated signals in response to the plurality of offsets to generate a plurality of adjusted isolated signals and wherein the combine signal is generated in response to the plurality of adjusted isolated signals. These plurality of offsets may include frequency offsets, magnitude offsets and phase offsets. In some exemplary embodiments, the receiver 430 may include multiple receiver elements forming a receiver array and may include a central receiver processor 440 to perform the combination of the data signals, determination of the offsets, and transmission of the offsets to the transmitter processor 410 if a back channel exists.

Figure 5:
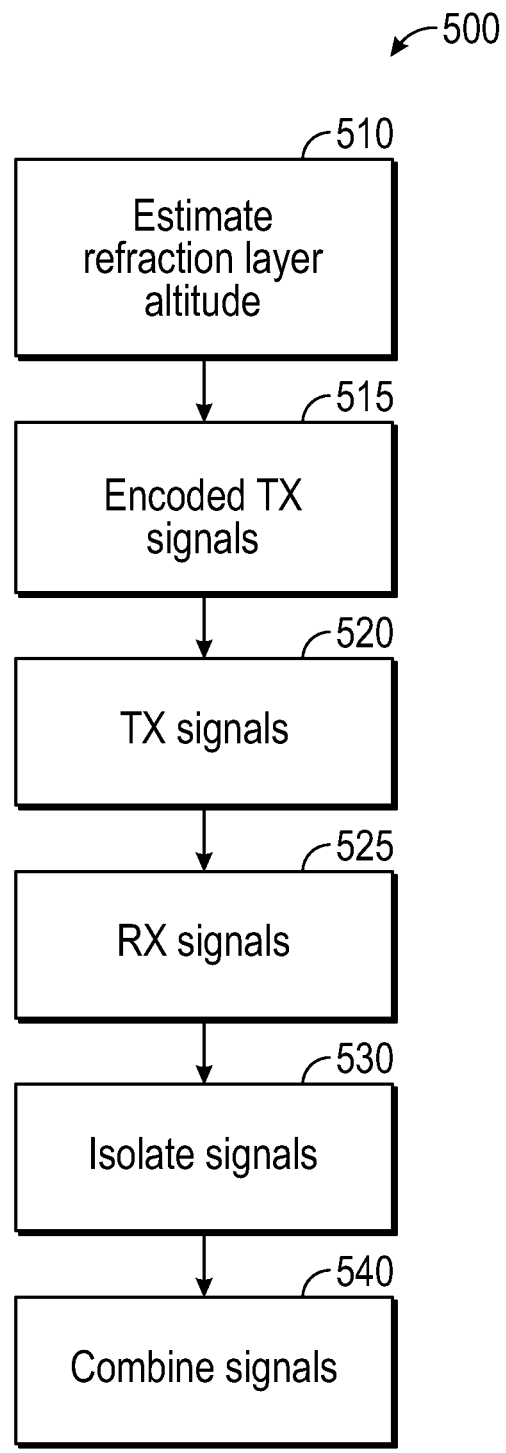
FIG. 5 shows a flow diagram illustrating another method for transmission of electromagnetic and/or acoustic signals within an atmospheric ducted condition according to an exemplary embodiment.

Turning now to FIG. 5, a flow diagram illustrating another non-limiting embodiment of a method 500 for transmitting and receiving of electromagnetic signals within an atmospheric ducted condition according to an exemplary embodiment is shown. The exemplary method is configured to take advantage of atmospheric ducting to extend the propagation distance of electromagnetic information signals.

The method is first configured to determine 510 an altitude of an atmospheric refractive layer. This altitude may be determined using an electromagnetic pulse transmitted from a transceiver proximate to, or integral to, a transmitter array or the like. The transmitter may monitor the propagation time of the pulse between transmission and reception of the reflected pulse from the atmospheric refractive layer to determine the altitude of the atmospheric refractive layer. Alternatively, the method may estimate the altitude of the atmospheric refractive layer in response to an ambient humidity, ambient temperature and/or atmospheric pressure.

In some exemplary embodiments, the altitude of an atmospheric refractive layer may be determined in response to a bending of a light ray due to the density gradient of the refractive layer. A light pulse may be transmitted and the light path may be observed using an observation device, such as a camera or the like, to record the path of the light. The refraction coefficient may then be determined in response to the radius of the curvature of the light path.

Next, the method is configured for encoding 515 a data signal with a first synchronization sequence to generate a first transmission signal and encoding the data signal with a second synchronization sequence to generate a second transmission signal. Each of the transmitted signals may be configured to carry the same data signal so that the signals may be constructively combined at the receiver array in order to increase SNR and reduce error rate for the transmitted signals. Each synchronization sequence is unique for each of the transmitters of the transmitter array. This allows for the individual signals to be isolated from other signals at the receiver.

The method is next configured for transmitting 520, using a first transmitter, the first transmission signal at a first elevation angle determined in response to the altitude of the atmospheric refractive layer. The transmitter elevation angle may be determined to maximize the propagation distance of the transmitted signal by taking advantage of the signal reflection from the atmospheric refractive layer. The elevation angle may further be determined in response to the estimated location of the receiver. For example, the transmitter may raise the elevation of the transmitter in response to the receiver being located closer to the transmitter or lower the elevation of the transmitter in response to the receiver being located farther from the transmitter. The elevation angle of the transmitter may be varied over a certain range before excessive signal loss is experienced to do transmission though the reflection layer other signal losses due to noise, weather related signal attenuation or non-linearities. In some exemplary embodiments, the first synchronization sequence is a pilot symbol.

The method is further configured for transmitting 520, using a second transmitter, the second transmission signal at a second elevation angle determined in response to the altitude of the atmospheric refractive layer. The first transmitter and the second transmitter may form a portion of a transmitter array along with other transmitters for transmitter other transmission signals. In some exemplary embodiments, the transmitter array may transmit any number of transmission signals, each with the same data and unique synchronization sequences. This number of transmitted signals may be limited by the number of signals that may be processed by each receiver. In addition, the transmitted signals may be transmitted simultaneously such that the arrive at each of the receiver elements of the receiver array substantially simultaneously.

In some exemplary embodiments, the transmit elevation angle of the first transmitted signal may be different form the transmit elevation angle of the second transmitted signal. For example, the first transmitted signal may be transmitted at an elevation angle equal to the determined elevation angle for the particular altitude of the atmospheric refractive layer. The second transmitted signal may be transmitted at an elevation angle slightly different from the determined elevation angle, such as plus or minus half a degree. Other simultaneously transmitted signals from the transmitter array may also be slightly varied from the determined elevation angle in order to compensate for variations in the atmospheric refractive layer altitude, changing weather conditions, changes in orientation or position of the transmitter array, etc. Thus, as a result of the variations of transmit elevation angle, some signals may be incident on the atmospheric refractive layer at the optimal elevation angle even if the determined elevation angle deviates slightly from the optimal elevation angle. In addition, then the isolated signals are combined at the receiver, the variation in transmission elevation angle and associated reflection magnitude allows for a more constant combined signal magnitude as when one signal deviates away from the optimal reflection angle, another moves towards the optimal reflection angle.

The method is next configured for receiving 525, at a receiver, the first transmission signal and the second transmission signal. The multiple transmission signals will be received simultaneously as a received signal at each of the receiver array elements. The method next is configure for isolating 530 the data signal from the first transmission signal in response to the first synchronization sequence to generate a first isolated data signal and determining a first offset of the first isolated data signal and isolating 530 the data signal from the second transmission signal in response to the second synchronization sequence to generate a second isolated data signal and determining a second offset of the second isolated data signal. The unique synchronization sequences allow each of the transmitted signals to be isolated and extracted from the common received signal which includes representations of all of the transmitted signals.

The method is next operative for combining 540 the first isolated data signal and the second isolated data signal in response to the first offset and the second offset. The first offset and the second offset include at least one of a frequency offset, phase offset, and magnitude offset. These determined offsets allow for each of the isolated data signals to be shifted in time, phase frequency, or magnitude to compensate for signal loss, noise, and differences in propagation distance of each of the transmitted signals.

In some exemplary embodiments where a feedback channel or transmission medium is available between the transmitter array and the receiver array, the first offset and the second offset may be transmitted from the receiver array to the transmitter array so that subsequent transmitted signals may be adjusted to compensate for these receiver offsets to further facilitate generation of a combined signal. For example, the method may be configured to coupling the first offset to the first transmitter and wherein the first transmitter is further configured to transmit a third transmission signal generated in response to the first offset.

In addition, the method may be further configured to determine an optimal elevation angle in response to the first transmission signal and the second transmission signal and to couple the optimal elevation angle to the first transmitter and the second transmitter. The optimal elevation angle may be determined in response to one of the received representations of the transmitted signals having lowest signal loss or lowest error rate, least interference, or the like. The optimal elevation angle may also be determined in response to the combined signal generated in response to the various isolated transmission signals and manipulation of the various offset values or the like.

In another exemplary embodiment, the method may be performed by various components of a communications system including transmitting, by a transmitter array, a first transmission signal at a first elevation angle and azimuth angle wherein the first transmission signal includes a first synchronization sequence, a second transmission signal at a second elevation angle wherein the second transmission signal includes a second synchronization sequence; and a third transmission signal at a third elevation angle wherein the third transmission signal includes a third synchronization sequence. The method may next receive, at a receiver array, the first transmission signal, the second transmission signal, and the third transmission signal The method is further configured for isolating, by a processor, a data signal from the first transmission signal in response to the first synchronization sequence, the data signal from the second transmission signal in response to the second synchronization sequence, and the data signal from the third transmission signal. The method next determines a first offset in response to the data signal from the first transmission signal, a second offset in response to the data signal from the second transmission signal, and a third offset in response to the data signal from the third transmission signal.

In some exemplary embodiments, the method may be further configured for estimating an optimal transmit elevation angle in response to the first offset, the second offset, and the third offset and transmitting the optimal transmit elevation angle to the transmitter array. In response to receive the optimal transmit elevation angle, the transmitter array may be further configured to transmit a fourth transmission signal in response to the optimal transmit elevation angle. For example, the fourth transmission signal may be part of a microwave link between the transmitter and the receiver.

Figure 6:
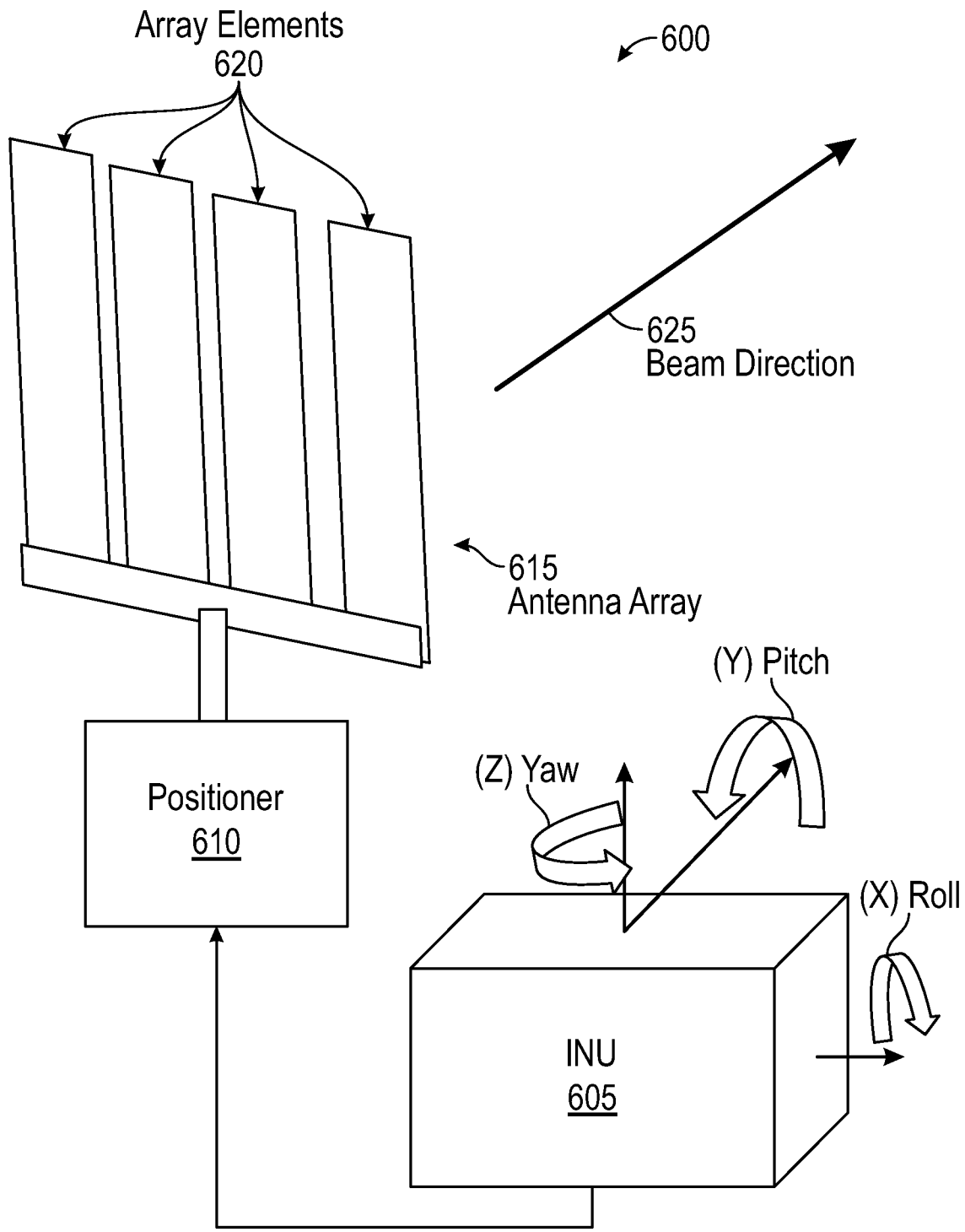
FIG. 6 shows an exemplary inertial navigation unit for transmission of electromagnetic and/or acoustic signals within an atmospheric ducted condition according to an exemplary embodiment.

Turning now to FIG. 6, an exemplary system 600 for transmitting and receiving electromagnetic and/or acoustic signals within an atmospheric duct condition including an integrated navigation unit (INU) 605. In some exemplary embodiments, the system 600 may include an antenna array 615 for transmitting and/or receiving electromagnetic and/or acoustic signals. The antenna array 615 may include a plurality of array elements 620, each operative to transmit a separate signal. In some exemplary embodiments, the antenna array 615 may be mechanically or electronically steerable. A physically steerable array uses a position 610 to physically change the azimuth and elevation of the antenna array 615, resulting in a corresponding change in the array beam direction 625. An electronically steerable array, such as a phased array, may apply phase shifted signals to teach of the array elements 620 to electronically steer the beam direction 625 to different azimuth and/or elevation angles.

The exemplary INU 605 may be operative to provide an initial starting point for beam pointing direction and elevation in an exemplary communications system. The INU 605 may be used to determine a beam elevation starting point as the beam elevation angle is typically near parallel with the earth's surface. This beam elevation angle may be coupled to the positioner 610 for mechanically or electronically steering the antenna array 615 to the desired beam direction 625. The INU 605 may also provide the beam direction 625, or corresponding return beam direction, to a far end radio for cases where the far end radio location is known. The INU 605 may further be operative to adjust a transmit signal frequency to determine the best propagation frequency. The best propagation frequency may be determined by the lowest loss and/or the most reliable signal frequency for use through the ducting channels. The INU 605 may then adjust a multi-beam pattern to find other radios with different channel ducting characteristics.

In some exemplary embodiments, The INU 605 may include an attitude sensor that measures Roll, Pitch, and Yaw, to provide self-attitude information to the previously disclosed array antenna system. These Roll, Pitch, and Yaw measurements may then be used to set the beam direction 625 between transmit location and receive location. In addition, the INU 605 may include a compass and/or global positioning system (GPS) to provide location information to the antenna array 615 and/or positioner 610. This location information may then be used to set control the beam steering and direction 625. The measurements may be used to provide the coarse beam pointing weights, or elevation, azimuth heading for a mechanically pointed array, such that coarse beam acquisition can be achieved. A custom algorithm built on artificial intelligence may be used to read the information and determine the desired beam direction. The radio carrier frequency may be tuned while the radio metrics are monitored. Parameters such as bit and frame error rate, SNR provide feedback may be used to optimize the channel performance. When the frequency change results in an adequate threshold performance, the frequency may no longer be tuned. The exemplary system 600 may measure channel propagation characteristics to multiple receivers and independently adjust the angle and elevation of the beam direction 625 to optimize the link through each separate radio connection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general-purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

What is claimed is:

1. A method for transmitting a data signal comprising:
estimating an altitude of an atmospheric refractive layer;
encoding a data signal with a first synchronization sequence to generate a first transmission signal and encoding the data signal with a second synchronization sequence to generate a second transmission signal;
transmitting, using a first array element, the first transmission signal at a first elevation angle determined in response to the altitude of the atmospheric refractive layer;
transmitting, using a second array element, the second transmission signal at a second elevation angle determined in response to the altitude of the atmospheric refractive layer;
receiving, at a receiver, the first transmission signal and the second transmission signal;
isolating the data signal from the first transmission signal in response to the first synchronization sequence to generate a first isolated data signal and determining a first offset of the first isolated data signal;
isolating the data signal from the second transmission signal in response to the second synchronization sequence to generate a second isolated data signal and determining a second offset of the second isolated data signal; and
combining the first isolated data signal and the second isolated data signal in response to the first offset and the second offset.

2. The method of claim 1 wherein the altitude of the atmospheric refractive layer is estimated in response to a propagation time of an electromagnetic pulse transmitted from a third array element.

3. The method of claim 1 wherein the altitude of the atmospheric refractive layer is estimated in response to at least one of the ambient temperature, atmospheric pressure and humidity.

4. The method of claim 1 wherein the first transmitted signal includes a first synchronization sequence and wherein the first synchronization sequence is a pilot symbol.

5. The method of claim 1 the second elevation angle is not equal to the first elevation angle.

6. The method of claim 1 further including coupling the first offset to the first array element and wherein the first array element is further configured to transmit a third transmission signal generated in response to the first offset.

7. The method of claim 1 wherein the first offset and the second offset include at least one of a frequency offset, phase offset, and magnitude offset.

8. The method of claim 1 wherein the receiver is further configured to determine an optimal elevation angle in response to the first transmission signal and the second transmission signal and to couple the optimal elevation angle to the first array element and the second array element.

9. The method of claim 1 wherein the first array element and the second array element form part of a transmitter array.

10. A communications system comprising:
a transmit processor for determining transmit elevation in response to a refractive layer altitude;
a transmitter array including a plurality of transmitters each for transmitting one of a plurality of transmitted signals in response to the transmit elevation wherein each of the plurality of transmitted signals is encoded using a data signal and one of a plurality of unique synchronization sequences, wherein each of the plurality of unique synchronization sequences corresponds to one of the plurality of transmitted signals; and
a receiver configured for receiving the plurality of transmitted signals, isolating each of the plurality of transmitted signals in response to one of the plurality of unique synchronization sequences corresponding to each of the plurality of transmitted signals to generate a plurality of isolated signals, to combine the plurality of isolated signals to generate a combined signal and to generate the data signal in response to the combined signal.

11. The communications system of claim 10, wherein the transmitter array is further configured to transmit a transmitter position, a transmitter navigation, and a transmitter timing to the receiver.

12. The communications system of claim 10, wherein the refractive layer altitude is determined in response to at least one of a atmospheric pressure, an ambient temperature, and an ambient humidity level.

13. The communications system of claim 10, wherein each of the plurality of transmitted signals are transmitted with a random transmit elevation within one degree of the transmit elevation.

14. The communications system of claim 10, wherein the receiver array is configured to determine an optimal transmit elevation in response to the combined signal and to couple the optimal transmit elevation to the transmitter array.

15. The communications system of claim 14, wherein the transmitter array is further configured to transmit a second plurality of signals in response to the optimal transmit elevation.

16. The communications system of claim 14, wherein the transmitter array is further configured to couple the optimal transmit elevation to a microwave transmitter for transmitting a microwave signal in response to the optimal transmit elevation.

17. The communications system of claim 10, wherein the receiver array is configured to determine a plurality of offsets in response to the plurality of isolated signals, to adjust the plurality of isolated signals in response to the plurality of offsets to generate a plurality of adjusted isolated signals and wherein the combine signal is generated in response to the plurality of adjusted isolated signals.

18. The communications system of claim 17, wherein the plurality of offsets may include frequency offsets, magnitude offsets and phase offsets.

19. A method of communications comprising:
transmitting, by a transmitter array, a first transmission signal at a first elevation angle wherein the first transmission signal includes a first synchronization sequence, a second transmission signal at a second elevation angle wherein the second transmission signal includes a second synchronization sequence; and a third transmission signal at a third elevation angle wherein the third transmission signal includes a third synchronization sequence;

receiving, at a receiver array, the first transmission signal, the second transmission signal, and the third transmission signal;

isolating, by a processor, a data signal from the first transmission signal in response to the first synchronization sequence, the data signal from the second transmission signal in response to the second synchronization sequence, and the data signal from the third transmission signal;

determining an first offset in response to the data signal from the first transmission signal, a second offset in response to the data signal from the second transmission signal, and a third offset in response to the data signal from the third transmission signal;

estimating an optimal transmit elevation angle in response to the first offset, the second offset, and the third offset, and transmitting the optimal transmit elevation angle to the transmitter array.

20. The method of claim 19 wherein the transmitter array is further configured to transmit a fourth transmission signal in response to the optimal transmit elevation angle.

* * * * *